(12) United States Patent
Fujimura et al.

(10) Patent No.: US 8,531,754 B2
(45) Date of Patent: Sep. 10, 2013

(54) ELECTROCHROMIC DISPLAY ELEMENT

(75) Inventors: Koh Fujimura, Tokyo (JP); Shigenobu Hirano, Kanagawa (JP); Tohru Yashiro, Kanagawa (JP); Yoshihisa Naijo, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 92 days.

(21) Appl. No.: 13/105,320

(22) Filed: May 11, 2011

(65) Prior Publication Data
US 2011/0279884 A1    Nov. 17, 2011

(30) Foreign Application Priority Data

May 13, 2010    (JP) ................................. 2010-111571
May 6, 2011     (JP) ................................. 2011-103387

(51) Int. Cl.
*G02F 1/153* (2006.01)

(52) U.S. Cl.
USPC ........................................................ 359/270

(58) Field of Classification Search
USPC ................. 359/265, 267, 270–273; 428/426; 429/323
See application file for complete search history.

(56) References Cited

U.S. PATENT DOCUMENTS

| 7,057,789 B2 * | 6/2006 | Shinozaki et al. ............ 359/265 |
| 7,072,091 B2 * | 7/2006 | Udaka et al. ................ 359/265 |
| 2002/0196519 A1 * | 12/2002 | Elkadi et al. ................ 359/265 |
| 2005/0025980 A1 | 2/2005 | Agrawal et al. |
| 2006/0066803 A1 * | 3/2006 | Aylward et al. .............. 349/158 |
| 2007/0024948 A1 | 2/2007 | Hirano et al. |
| 2008/0013152 A1 * | 1/2008 | Hirano et al. ............... 359/265 |
| 2008/0020007 A1 * | 1/2008 | Zang .......................... 424/401 |
| 2009/0231663 A1 * | 9/2009 | Hirano et al. ............... 359/273 |
| 2012/0050838 A1 * | 3/2012 | Hirano et al. ............... 359/273 |

FOREIGN PATENT DOCUMENTS

| EP | 1253461 A2 | 10/2002 |
| JP | 2003-121883 | 4/2003 |
| JP | 2006-106669 | 4/2006 |
| JP | 3955641 | 5/2007 |
| JP | 2010-33016 | 2/2010 |
| JP | 2010-33016 A * | 2/2010 |
| WO | WO98/35267 | 8/1998 |
| WO | WO2006/008776 A | 1/2006 |

OTHER PUBLICATIONS

Aug. 22, 2011 European search report in connection with counterpart European patent application No. 11 16 5655.

* cited by examiner

*Primary Examiner* — Alessandro Amari
*Assistant Examiner* — Jie Lei
(74) *Attorney, Agent, or Firm* — Cooper & Dunham LLP

(57) ABSTRACT

An electrochromic display element including a display substrate, at least one display electrode, a counter electrode, a counter substrate, at least one electrochromic layer in contact with the display electrode, and an electrolyte layer between the electrochromic layer and the counter electrode, wherein the electrolyte layer contains a matrix resin having a three-dimensionally crosslinked structure and a mixture of a liquid crystal compound and an electrolyte, and wherein the mixture of the liquid crystal compound and the electrolyte is dispersed as a continuous phase in the matrix resin.

8 Claims, 2 Drawing Sheets

ELECTROCHROMIC DISPLAY ELEMENT

BACKGROUND OF THE INVENTION

1. Field of the Invention

The present invention relates to an electrochromic display element in which an electrochromic compound exhibits high-speed response of color developing or erasing as well as image blur is reduced.

2. Description of the Related Art

In recent years, development has extensively been made on electronic paper as a medium in place of paper. Electronic paper is a display device used like paper, and thus needs to meet requirements different from those for conventional display devices such as CRTs and liquid crystal displays. For example, electronic paper is required to have high white reflectance, high contrast ratio, high-definition display performance and display memory effect as well as to be thin, light, inexpensive and able to drive at even low voltages. Of these, white reflectance and contrast ratio that are comparable to those of paper are highly required, since these requirements influence the display quality obtained.

Display devices for use in electronic paper include those using reflective liquid crystals, those using electrophoresis and those using toner migration.

Any of these display devices, however, has much difficulty in performing multi-color display while ensuring white reflectance and contrast ratio. In general, a color filter is provided for performing multi-color display. In this case, the color filter, whose pixels are each segmented into three regions of red (R), green (G) and blue (B), absorbs light to problematically reduce reflectance of the display device.

In order to solve such problems, electrochromic display elements with no color filter have been proposed. The electrochromic display elements develop or erase color using an electrochromic compound which reversibly changes in color through reversible oxidoreduction reaction upon application of voltage.

The electrochromic display elements, however, have problematically slow response speed of color developing or erasing, since they develop or erase color utilizing oxidoreduction reaction.

In order to solve such problems, for example, Japanese Patent Application Laid-Open (JP-A) No. 2001-510590 proposes a method in which an electrochromic compound is fixed in the vicinity of an electrode to increase response speed of color developing or erasing. According to this proposal, although the time required from color developing to color erasing is conventionally about 10 sec, the color developing time from colorless to blue and the color erasing time from blue to colorless are both shortened to be about 1 sec.

However, demand has arisen for further improvement of response speed of color developing or erasing.

Meanwhile, the electrochromic display elements can develop various colors depending on the structure of the electrochromic compound, and become a promising multi-color display device. For example, JP-A No. 2003-121883 proposes a multi-color display device containing, in a stacked state, several kinds of electrochromic compound fine particles that develop color at different voltages.

However, by controlling the voltage, this multi-color display device can develop one color but cannot develop several colors simultaneously, since the electrochromic compounds stacked in the multi-color display device are compounds that develop different colors at different voltages.

Also, JP-A No. 2006-106669 proposes a display device containing electrochromic layers on an electrode, which are made of several different electrochromic compounds having different threshold voltages and charge quantities for color developing. This display device develops multi colors utilizing differences between the voltages or currents required for color developing.

The display device according to this proposal can develop several colors simultaneously, but requires complicate control of the voltage or current to selectively develop any color, since the display device has several kinds of electrochromic compounds that develop different colors.

In order to solve such problems, for example, JP-A No. 2010-033016 proposes an electrochromic display element containing a display substrate, a plurality of display electrodes provided on the display substrate, and a plurality of electrochromic layers provided correspondingly to the display electrodes.

However, use of an electrolyte prepared by dissolving a supporting electrolyte in a solvent, as described in prior arts, causes charges to be diffused in the electrolyte from the electrochromic compound developing color, leading to problematic image blur; i.e., bleeding due to spread of color-developing portions which occurs over time when the nearby electrochromic compounds not developing color also cause color-developing reaction. Also, use of a solid electrolyte such as a polymer electrolyte, as described in prior arts, prevents image blur to some extent but retards response of color developing or erasing.

Therefore, at present, keen demand has arisen for development for an electrochromic display element in which an electrochromic compound exhibits high-speed response of color developing or erasing as well as image blur is reduced.

BRIEF SUMMARY OF THE INVENTION

The present invention aims to solve the existing problems and achieve the following objects. That is, an object of the present invention is to provide an electrochromic display element in which an electrochromic compound exhibits high-speed response of color developing or erasing as well as image blur is reduced.

Means for solving the above problems are as follows.

<1> An electrochromic display element including:
a display substrate,
at least one display electrode,
a counter electrode,
a counter substrate,
at least one electrochromic layer in contact with the display electrode, and
an electrolyte layer between the electrochromic layer and the counter electrode,
wherein the electrolyte layer contains a matrix resin having a three-dimensionally crosslinked structure and a mixture of a liquid crystal compound and an electrolyte, and
wherein the mixture of the liquid crystal compound and the electrolyte is dispersed as a continuous phase in the matrix resin.

<2> An electrochromic display element including:
a display substrate,
a plurality of display electrodes spaced from each other,
a plurality of electrochromic layers which are respectively in contact with the plurality of the display electrodes,
a counter substrate,
a counter electrode, and
an electrolyte layer between the counter electrode and the display electrode that is located nearest to the counter electrode, wherein the electrolyte layer contains a matrix resin having a three-dimensionally crosslinked structure and a mixture of a liquid crystal compound and an electrolyte, wherein the mixture of the liquid crystal compound and the electrolyte is dispersed as a continuous phase in the matrix resin, and wherein an electrical resistance between one of the display electrodes and the other display electrode or any of the other display electrodes is greater than an electrical resistance of the one of the display electrodes.

<3> The electrochromic display element according to <1> or <2>, wherein the matrix resin is formed of an ultraviolet ray-curable resin material.

<4> The electrochromic display element according to any one of <1> to <3>, wherein the electrochromic layer contains fine conductive particles or fine semiconductor particles carrying an electrochromic compound on surfaces thereof.

<5> The electrochromic display element according to <3> or <4>, wherein the electrolyte layer is formed by applying ultraviolet rays through the counter substrate or the display substrate to the mixture of the liquid crystal compound and the electrolyte as well as a polymerizable monomer or oligomer of the matrix resin, to polymerize the polymerizable monomer or oligomer.

The present invention can provide an electrochromic display element in which an electrochromic compound exhibits high-speed response of color developing or erasing as well as image blur is reduced. This electrochromic display element can solve the existing problems.

DETAILED DESCRIPTION OF THE INVENTION

Electrochromic Display Element

First Embodiment

An electrochromic display element of the present invention includes a display substrate, a display electrode, an electrochromic layer, an electrolyte layer, a counter electrode and a counter substrate; and, if necessary, further includes other members.

Figure 1:
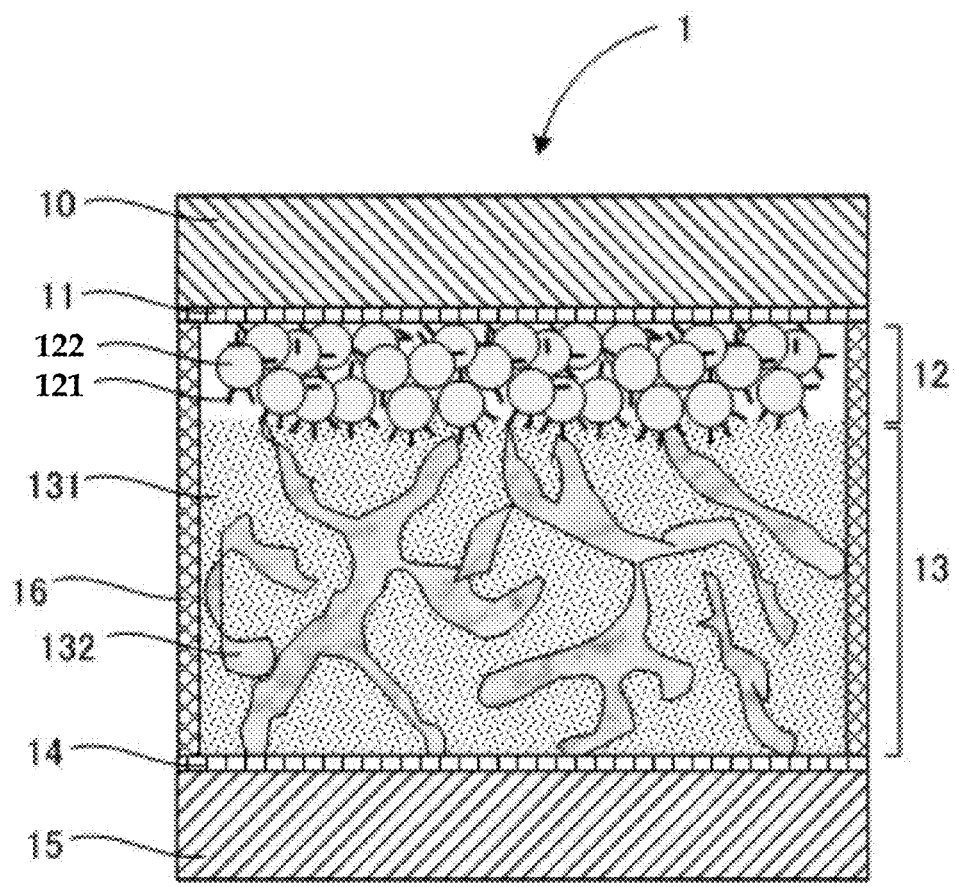
FIG. 1 is a schematic cross-sectional view of one exemplary electrochromic display element according to a first embodiment of the present invention.

As shown in FIG. 1, an electrochromic display element 1 according to a first embodiment of the present invention includes a counter substrate 15, a counter electrode 14, an electrolyte layer 13, an electrochromic layer 12, a display electrode 11 and a display substrate 10, which are laminated in this order.

<<Display Substrate and Counter Substrate>>

The display substrate 10 is a substrate for supporting the display electrode 11. The counter substrate 15 is a substrate for supporting the counter electrode 14. The material of the display substrate 10 or the counter substrate 15 is not particularly limited and may be appropriately selected depending on the intended purpose, so long as at least one of the display substrate 10 and the counter substrate 15 is made of a transparent material. Examples thereof include a glass substrate and a plastic film.

<<Display Electrode and Counter Electrode>>

The display electrode 11 is an electrode for controlling the potential of the counter electrode 14 to make the electrochromic layer 12 to develop color. The display electrode 11 is in contact with the display substrate 10.

The counter electrode 14 is an electrode for controlling the potential of the display electrode 11 to make the electrochromic layer 12 to develop color. The counter electrode 14 is in contact with the counter substrate 15.

The material of the display electrode 11 or the counter electrode 14 is not particularly limited, so long as it has conductivity, and may be appropriately selected depending on the intended purpose. Preferably, at least one of the display electrode 11 and the counter electrode 14 is made of a transparent conductive material excellent in transparency and conductivity in order for light to emit toward the outside. Also, for attaining stable color developing and color erasing, the transparent conductive material preferably causes opposite oxidoreduction reaction to that occurring in the electrochromic layer 12; i.e., causes reduction reaction when the electrochromic layer 12 develops color through oxidation and causes oxidation reaction when the electrochromic layer 12 develops color through reduction. Here, the term "transparency" or "transparent" means that the light transmittance is 10% to 100% in the visible light region.

Examples of the transparent conductive material include tin-doped indium oxide (ITO), fluorine-doped indium oxide (FTO), antimony-doped tin oxide (ATO); indium oxides (In oxides), tin oxides (Sn oxides) and zinc oxides (Zn oxides) which are formed into a film in vacuum. These may be used alone or in combination. Among them, the transparent conductive material preferably contains In oxides, Sn oxides or Zn oxides from the viewpoints of enabling easy film formation and attaining good transparency and electrical conductivity.

Examples of the In oxide include InSnO and $In_2O_3$.

Examples of the Sn oxide include SnO.

Examples of the Zn oxide include GaZnO and ZnO.

The counter electrode 14 may be formed by coating the counter substrate 15 with the transparent conductive material.

<<Electrochromic Layer>>

The electrochromic layer 12 contains electrochromic compounds 121 that change in color through oxidoreduction. The electrochromic layer 12 is a layer in which the electrochromic compounds 121 are arranged.

The electrochromic compound 121 may be, for example, an inorganic electrochromic compound and an organic electrochromic compound.

Examples of the organic electrochromic compound include viologen compounds, rare-earth phthalocyanine compounds, polypyrrole compounds, azobenzene compounds, anthraquinone compounds, diarylethene compounds, dihydroprene compounds, styryl compounds, styrylspiropyran compounds, spirooxazine compounds, spirothiopyran compounds, spiropyran compounds, thioindigo compounds, tetrathiafulvalene compounds, terephthalic acid compounds, triphenylmethane compounds, triphenylamine compounds, naphthopyran compounds, pyrazoline compounds, phenazine compounds, phenylenediamine compounds, phenoxazine compounds, phenothiazine compounds, phthalocyanine compounds, fluorane compounds, fulgide compounds, benzopyrane compound, metallocene compounds and pyridine compounds. Of these, viologen compounds, terephthalic acid compounds and pyridine compounds are preferred, since they can conduct color developing or erasing at a low potential and exhibit good color value.

The viologen compounds are preferably compounds represented by the following Structural Formula (1).

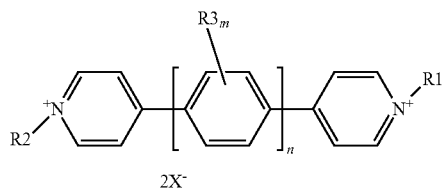

In Structural Formula (1), R1, R2 and R3 each represent a substituted or unsubstituted C1-C4 alkyl group or a substituted or unsubstituted aryl group, at least one of R1 and R2 is selected from COOH, $PO(OH)_2$ and $Si(OC_kH_{2k+1})_3$, $X^-$ represents a monovalent anion, n is an integer of 0, 1 or 2, m is an integer of 0, 1, 2, 3 or 4 and k is an integer of 0, 1 or 2.

The terephthalic acid compounds are preferably compounds represented by the following Structural Formula (2).

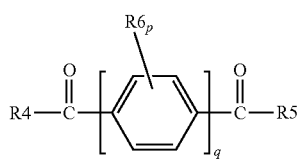

In Structural Formula (2), R4, R5 and R6 each represent a substituted or unsubstituted C1-C4 alkyl group, a substituted or unsubstituted C1-C4 alkoxy group or a substituted or unsubstituted aryl group, at least one of R4 and R5 is selected from COOH, $PO(OH)_2$ and $Si(OC_kH_{2k+1})_3$, q is an integer of 1 or 2, p is an integer of 0, 1, 2, 3 or 4 and k is an integer of 0, 1 or 2.

The pyridine compounds are preferably compounds represented by the following Structural Formula (3).

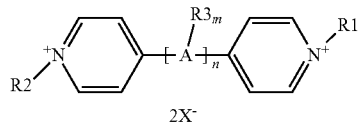

In Structural Formula (3), R1, R2 and R3 each represent a substituted or unsubstituted C1-C4 alkyl group or a substituted or unsubstituted aryl group, at least one of R1 and R2 is selected from COOH, $PO(OH)_2$ and $Si(OC_kH_{2k+1})_3$, $X^-$ represents a monovalent anion, n is an integer of 0, 1 or 2, m is an integer of 0, 1 or 2, k is an integer of 0, 1 or 2 and A denotes a derivative of a heterocyclic compound.

Specific examples of the compounds represented by the above Structural Formulas (1) to (3) include the following compounds, but employable compounds should not be construed as being limited thereto.

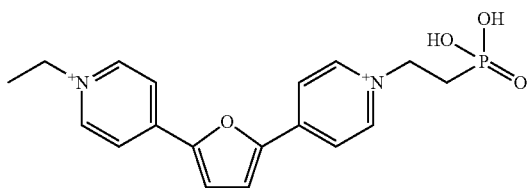

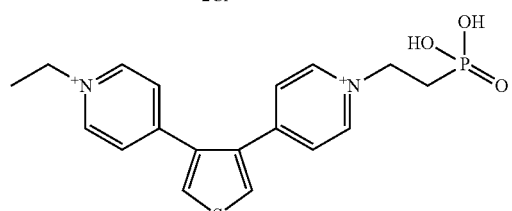

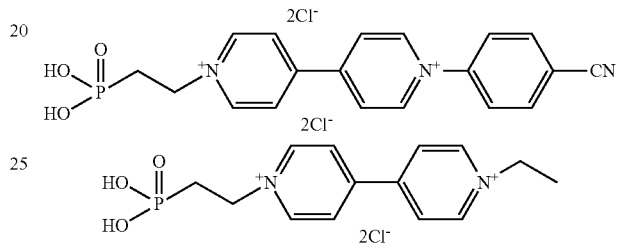

Examples of the inorganic electrochromic compound include titanium oxide, vanadium oxide, tungsten oxide, indium oxide, iridium oxide, nickel oxide, molybdenum oxide and Prussian blue.

The electrochromic layer 12 preferably contains fine conductive particles or fine semiconductor particles 122 carrying the electrochromic compounds 121 on their surfaces (hereinafter the fine conductive particles and the fine semiconductor particles may be collectively referred to as "fine conductive particles"). The electrochromic compounds 121 on the surfaces of the fine conductive particles 122 allow electrons to be efficiently injected into the electrochromic compounds 121 by virtue of the large surface areas of the fine conductive particles 122, attaining high-speed response as compared with the existing electrochromic display elements. Furthermore, use of the fine conductive particles 122 can form a transparent film, and thus achieves a high white reflectance.

The fine conductive particles 122 are not particularly limited, so long as they are metal oxides. Examples thereof include titanium oxide, zinc oxide, tin oxide, zirconium oxide, cerium oxide, yttrium oxide, boron oxide, magnesium oxide, strontium titanate, potassium titanate, barium titanate, calcium titanate, calcium oxide, ferrite, hafnium oxide, tungsten oxide, iron oxide, copper oxide, nickel oxide, cobalt oxide, barium oxide, strontium oxide, vanadium oxide, aluminosilicic acid, potassium phosphate and aluminosilicate. These may be used alone or in combination.

The shape of the fine conductive particles 122 is not particularly limited. For efficiently carrying the electrochromic compounds 121, preferably, the fine conductive particles 122 each have such a shape that the surface area per volume (hereinafter referred to as "specific surface area") becomes large. For example, when the fine conductive particles 122 are aggregates of nanoparticles, the specific surface area becomes large, and thus the fine conductive particles 122 can efficiently carry the electrochromic compounds 121. As a result, multicolor display excellent in display contrast ratio of color developing or erasing can be attained.

Notably, two or more types of the fine conductive particles 122 having different average particle diameters may be used in combination. When the fine conductive particles 122 contains different fine conductive particles having different average particle diameters, spaces are formed in the electrochromic layer 12, which gives one advantage that the permeability of an electrolyte can be improved advantageously. Also, the electrochromic layer 12 is hardly distorted upon coating for layer formation, which gives another advantage that the production yield of an electrochromic element 1 can be increased.

Examples of the method for carrying the electrochromic compounds 121 on the fine conductive particles 122 include fixing the fine conductive particles 122 having an average particle diameter of about 5 nm to about 50 nm on the electrode surface through sintering, and adsorbing the electrochromic compounds 121 having a polar group (e.g., a phosphonic acid, a carboxyl group and a silanol group) on the fine conductive particles 122. Notably, the electrochromic compounds may be bonded to the metal oxides via adsorption groups.

<<Electrolyte Layer>>

The electrolyte layer 13 contains a matrix resin 132 and a mixture of a liquid crystal compound and an electrolyte (hereinafter the mixture of the liquid crystal compound and the electrolyte may be referred to as a "crystalline electrolyte" 131); and, if necessary, further contains other components.

As shown in FIG. 1, the electrolyte layer 13 is formed so as to have a PNLC (Polymer Network Liquid Crystal) structure, where the crystalline electrolyte 131 is dispersed as a continuous phase in the matrix resin 132 having a three-dimensionally crosslinked structure. Under no electrical field, the liquid crystal compounds do not have uniform molecular orientation. In this state, the refractive index of the liquid crystal compounds is not equal to that of the matrix resin 132. As a result, incident light is scattered, and due to backscattered light of the incident light, the electrolyte layer 13 is observed as white color. Under application of an electrical field, the molecules of the liquid crystal compounds are oriented along the direction of the electrical field (in FIG. 1, the molecules of the liquid crystal compounds are oriented in parallel between the substrates). In this state, the refractive index of the liquid crystal compounds is equal to that of the matrix resin 132. As a result, the electrolyte layer 13 becomes transparent.

—Electrolyte—

The electrolyte used may be a solution of a salt in a solvent. Notably, when the salt can be dissolved in the liquid crystal compound, the salt is not necessarily dissolved in the solvent.

Examples of the salt include inorganic ion salts, quaternary ammonium salts, acids, alkali salts and ionic liquids.

Examples of the inorganic ion salts include $LiClO_4$, $LiBF_4$, $LiAsF_6$, $LiPF_6$, $LiCF_3SO_3$, $LiCF_3COO$, KCl, $NaClO_3$, NaCl, $NaBF_4$, NaSCN, $KBF_4$, $Mg(ClO_4)_2$ and $Mg(BF_4)_2$.

Examples of cation components of the ionic liquid include imidazole derivatives, salts of aromatic compounds and aliphatic quaternary ammonium salts.

Examples of anion components of the ionic liquid include $BF^{4-}$, $CF_3SO^{3-}$, $PF^{4-}$ and $(CF_3SO_2)_2N^-$. The ionic liquid may be prepared by using these cation and anion components in combination.

Examples of the imidazole derivative include N,N-dimethylimidazole salts, N,N-methylethylimidazole salts and N,N-methylpropylimidazole salts.

Examples of the salts of the aromatic compounds include N,N-dimethylpyridinium salts and N,N-methylpropylpyridinium salts.

Examples of the aliphatic quaternary ammonium salts include trimethylpropylammonium salts, trimethylhexylammonium salts and triethylhexylammonium salts.

The solvent is preferably a polar solvent having electrical conductivity. Examples thereof include propylene carbonate, acetonitrile, γ-butyrolactone, ethylene carbonate, sulfolane, dioxolan, tetrahydrofuran, 2-methyltetrahydrofuran, dimethylsulfoxide, 1,2-dimethoxyethane, 1,2-ethoxymethoxyethane, polyethylene glycol, propylene carbonate and alcohols. These may be used alone or in combination. Notably, the electrolyte is not particularly limited to liquid electrolytes prepared by dissolving the salts in the solvents and may also be gelatinous electrolytes or solid electrolytes (e.g., polymer electrolytes).

—Liquid Crystal Compound—

The liquid crystal compound is not particularly limited. Examples thereof include nematic liquid crystal compounds, smectic liquid crystal compounds and cholesteric liquid crystal compounds.

Examples of the nematic liquid crystal compound include azomethine compounds, cyanobiphenyl compounds, cyanophenyl esters, fluorine-substituted phenyl esters, cyclohexanecarboxylic acid phenyl esters, fluorine-substituted cyclohexanecarboxylic acid phenyl esters, cyanophenylcyclohexanes, fluorine-substituted phenylcyclohexanes, cyano-substituted phenylpyrimidines, fluorine-substituted phenylpyrimidines, alkoxy-substituted phenylpyrimidines, fluorine-substituted alkoxy-substituted phenylpyrimidines, phenyldioxane, tolan compounds, fluorine-substituted tolan compounds and alkenylcyclohexylbenzonitriles. Further employable nematic liquid crystal compounds are described on pp. 154-192 and 715-722 of "Liquid Crystal Device Handbook" (edited by Committee 142 of Japan Society for the Promotion of Science, Nikkan Kogyo Shimbun Ltd., 1989). Specific examples include liquid crystal compounds manufactured by Merck Ltd. such as ZLI-4692, MLC-6267, 6284, 6287, 6288, 6406, 6422, 6423, 6425, 6435, 6437, 7700, 7800, 9000, 9100, 9200, 9300 and 10000; and liquid crystal compounds manufactured by Chisso Corp such as LIXON 5036xx, 5037xx, 5039xx, 5040xx and 5041xx.

For example, the cholesteric liquid crystal compounds are obtained from nematic liquid crystal compounds having no layer structure and having liquid crystal compounds oriented in parallel. Specifically, a chiral agent, which gives a twist to liquid crystal molecules, is added to the nematic liquid crystal compounds to impart optical rotation properties thereto.

The chiral agent is not particularly limited and may be appropriately selected from known chiral agents depending on the intended purpose. Examples thereof include isomannide compounds, catechin compounds, isosorbide compounds, fenchone compounds and carvone compounds from the viewpoint of improving the color purity and the color hue of the liquid crystal compound. These may be used alone or in combination.

Examples of the smectic liquid crystal compound include p-desiloxybenzilidene-p'-amino-2-methylbutyl cinnamate, p-hexyloxybenzilidene-p'-amino-2-chloropropyl cinnamate and 4-o-(2-methyl)butylresorcilydene-4'-octylaniline.

—Matrix Resin—

The matrix resin 132 is preferably made of an ultraviolet ray-curable resin in order for the crystalline electrolyte 131 to be dispersed as a continuous phase in the matrix resin 132 having a three-dimensionally crosslinked structure. The three-dimensionally crosslinked structure refers to a random structure containing a number of covalent bonds, from each of which three or more main chains are branched.

The matrix resin 132 is formed by applying ultraviolet rays, etc. through the counter substrate 15 or the display substrate 10 to the crystalline electrolyte 131 and a monomer or oligomer polymerizable with ultraviolet rays in the electrolyte layer 13, to polymerize the polymerizable monomer or oligomer. In this polymerization, the crystalline electrolyte 131 is dispersed as an continuous phase in the matrix resin 132.

Examples of the polymerizable monomer include styrene, chlorostyrene, α-methylstyrene, divinylbenzene, acrylic acid, methacrylic acid, fumaric acid, vinyl acetate, vinyl butyrate, vinyl benzoate, acrylonitrile, cetyl vinyl ether, limonene, cyclohexene, diallylphthalate, diallylisophthalate, 2-vinylpyridine, 3-vinylpyridine, 4-vinylpyridine, acrylamide, methacrylamide, N-hydroxymethylacrylamide, N-hydroxyethylmethacrylamide, alkyl ether compounds, a diol di(meth)acrylate produced by adding 2 mol or more of ethylene oxide to 1 mol of neopentyl glycol, a diol di(meth) acrylate produced by adding 2 mol or more of propylene oxide to 1 mol of neopentyl glycol, a triol di(meth)acrylate produced by adding 3 mol or more of ethylene oxide to 1 mol of trimethylolpropane, a triol tri(meth)acrylate produced by adding 3 mol or more of ethylene oxide to 1 mol of trimethylolpropane, a triol tri(meth)acrylate produced by adding 3 mol or more of propylene oxide to 1 mol of trimethylolpropane, a diol di(meth)acrylate produced by adding 2 mol or more of ethylene oxide to 1 mol of bisphenol A, a diol di(meth)acrylate produced by adding 2 mol or more of propylene oxide to 1 mol of bisphenol A, a product obtained through reaction between 1 mol of 2-hydroxyethyl(meth) acrylate and 1 mol of phenyl isocyanate, a product obtained through reaction between 1 mol of 2-hydroxyethyl(meth) acrylate and 1 mol of n-butyl isocyanate, poly(meth)acrylates of dipentaerythritol, hydroxypivalate neopentylglycol acrylate, and hydroxypivalate neopentylglycol diacrylate modified with 2 mol or less of caprolactone.

The above acrylic acid, methacrylic acid and fumaric acid may have a substituent including methyl, ethyl, n-propyl, n-butyl, amyl, 2-ethylhexyl, octyl, nonyl, dodecyl, hexadecyl, octadecyl, cyclohexyl, benzyl, methoxyethyl, butoxyethyl, phenoxyethyl, allyl, methallyl, glycidyl, 2-hydroxyethyl, 2-hydroxypropyl, 3-chloro-2-hydroxypropyl, dimethylaminoethyl, diethylaminoethyl, ethylene glycol, polyethylene glycol, propylene glycol, polypropylene glycol, 1,3-butylene glycol, tetramethylene glycol, hexamethylene glycol, neopentyl glycol, trimethylolpropane, glycerin and pentaerithritol.

Examples of the polymerizable oligomer include hydroxypivalate neopentylglycol diacrylate modified with more than 2 mol of caprolactone.

The matrix resin 132 does not have flowability, since it is obtained through polymerization performed by applying ultraviolet rays to the polymerizable monomer or oligomer which is an ultraviolet ray-curable resin material.

—Other Components—

The other components are not particularly limited and may be appropriately selected depending on the intended purpose. Examples thereof include a polymerization initiator, white pigment particles, truly spherical resin beads for adjusting the thickness of the electrolyte layer, a chain transfer agent, a photosensitizer, a dye and a crosslinking agent.

—Polymerization Initiator—

The polymerization initiator is not particularly limited and may be appropriately selected depending on the intended purpose. Examples thereof include 2-hydroxy-2-methyl-1-phenylpropan-1-one ("DAROCURE 1173," product of Merck Co.), 1-hydroxycyclohexyl phenyl ketone ("IRGACURE 184," product of Ciba Geigy Co.), 1-(4-isopropylphenyl)-2-hydroxy-2-methylpropan-1-one ("DAROCURE 1116," product of Merck Co.), benzyl dimethyl ketal ("IRGACURE 651," product of Ciba Geigy Co.), 2-methyl-1-[4-(methylthio)phenyl]-2-morpholinopropanone-1 ("IRGACURE 907," product of Ciba Geigy Co.), a mixture of 2,4-diethylthioxanthone ("KAYACURE DETX," product of NIPPON KAYAKU CO., LTD.) and ethyl p-dimethylaminobenzoate ("KAYACURE EPA," product of NIPPON KAYAKU CO., LTD.), and a mixture of isopropylthioxanthone ("QUANTACURE-ITX," product of WARD BLENKINSOP Co.) and ethyl p-dimethylaminobenzoate.

—White Pigment Particles—

Incorporation of the white pigment particles into the electrolyte layer can improve reflection contrast. Also, a white reflective layer is effective to improvement in visibility.

The white pigment particles are not particularly limited and may be selected depending on the intended purpose. Examples thereof include titanium oxide, aluminum oxide, zinc oxide, silica, cesium oxide and yttrium oxide.

By incorporating particles having light-accumulating properties into the white pigment particles, the brightness of the reflective layer can be increased using energy derived from external light to attain more bright display.

The electrochromic display element 1 of the present invention may be provided with a cell 16, if necessary. The cell 16 has a structure in which the display substrate 10 and the counter substrate 15 are attached to each other via a spacer. The cell 16 is charged with a crystalline electrolyte 131. Also, the white pigment particles may be contained in the cell 16.

Second Embodiment

Figure 2:
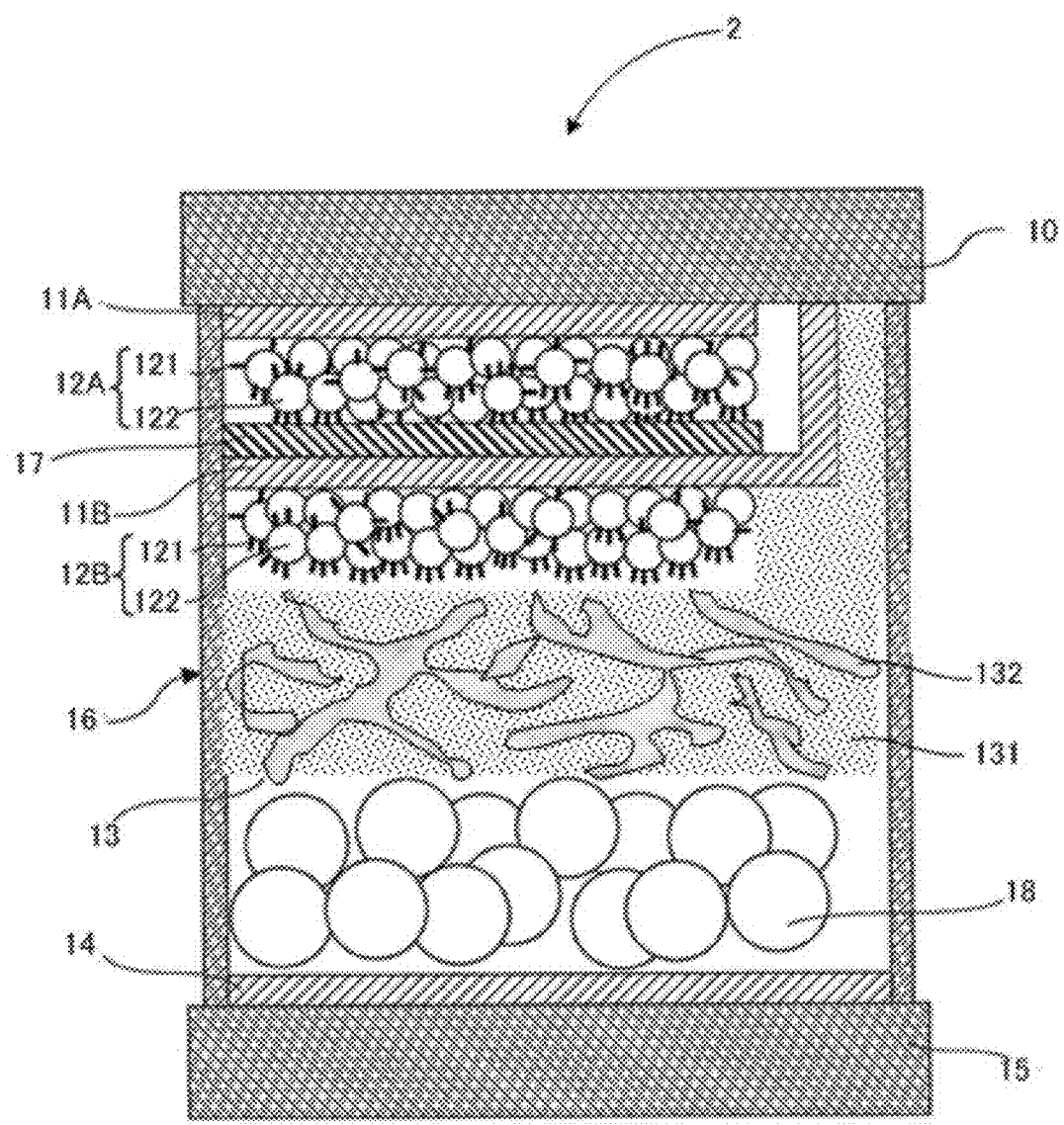
FIG. 2 is a schematic cross-sectional view of one exemplary electrochromic display element according to a second embodiment of the present invention.

As shown in FIG. 2, an electrochromic display element 2 according to a second embodiment of the present invention is the same as that according to the first embodiment, except that at least two display substrates 11 and at least two electrochromic layers 12 are provided. The same explanation as in the first embodiment is omitted as appropriate.

As shown in FIG. 2, the electrochromic display element 2 of the present invention includes a counter substrate 15, a counter electrode 14, an electrolyte layer 13, a second electrochromic layer 12B, a second display electrode 11B, an insulating layer 17, a first electrochromic layer 12A, a first display electrode 11A and a display substrate 10, which are laminated in this order; and, if necessary, further include other layers.

Also, the electrochromic display element 2 may have the cell 16 containing the display substrate 10 and the counter substrate 15 attached to each other via a spacer.

<<First Display Electrode and Second Display Electrode>>

The first display electrode 11A is an electrode for controlling the potential of the counter electrode 14 to make the first electrochromic layer 12A to develop color. The first display electrode 11A is in contact with the display substrate 10.

The second display electrode 11B is an electrode for controlling the potential of the counter electrode 14 to make the second electrochromic layer 12B to develop color. The second display electrode 11B is in contact with the display substrate 10.

The materials of the first display electrode 11A and the second display electrode 11B may be the same as those described in the first embodiment. The material of the first display electrode 11A and the material of the second display electrode 11B may be the same or different.

The resistance between the first display electrode 11A and the second display electrode 11B must be large to such an extent that the potential of one display electrode 11 to the counter electrode 14 can be controlled independently of the potential of the other display electrode 11 to the counter electrode 14. Specifically, the resistance therebetween must be larger than the sheet resistance of the first display electrode 11A or the second display electrode 11B. In the case where the resistance between the first display electrode 11A and the second display electrode 11B is smaller than the sheet resistance of the first display electrode 11A or the second display electrode 11B, when a voltage is applied to either the first display electrode 11A or the second display electrode 11B, the other display electrode receives a voltage having substantially the same intensity. As a result, the electrochromic layers 12 do not develop or erase color independently of each other in response to the corresponding display electrode in some cases. The resistance between the display electrodes 11 is preferably 500 or more times the sheet resistance of each display electrode. Notably, the resistance between the display electrodes corresponds to that between the first display electrode 11A and the second display electrode 11B.

In order to ensure such good insulating properties, the resistance between the display electrodes may be controlled by changing the average thickness of the first electrochromic layer 12A or the insulating layer 17 provided so as to be in contact with the first electrochromic layer 12A.

<<First Electrochromic Layer and Second Electrochromic Layer>>

The first electrochromic layer 12A and the second electrochromic layer 12B each contain an electrochromic compound 121, and develop color through oxidoreduction reaction of the electrochromic compound 121. When the first electrochromic layer 12A and the second electrochromic layer 12B each contain not only the electrochromic compounds 121 but also fine conductive particles 122 carrying the electrochromic compounds 121, color developing or erasing can be rapidly performed.

The materials of the first electrochromic layer 12A and the second electrochromic layer 12B may be the same as those described in the first embodiment. The material of the first electrochromic layer 12A and the material of the second electrochromic layer 12B may be the same or different.

<<Insulating Layer>>

The insulating layer 17 is provided for insulation between the first display electrode 11A and the second display electrode 11B. Notably, if the resistance can be adjusted to be larger between the first display electrode 11A and the second display electrode 11B, the insulating layer 17 may be omitted, if necessary.

The material of the insulating layer 17 is preferably a material containing at least ZnS excellent in insulation properties, durability and film formability. The ZnS has an advantageous feature that it can be formed rapidly into a film through sputtering without giving damage to the electrochromic layer.

Examples of materials containing the ZnS include ZnS—Ge, ZnS—$SiO_2$ (ZnS/$SiO_2$=8/2), ZnS—$SiO_2$ (ZnS/$SiO_2$=7/3), ZnS and ZnS—ZnO—$In_2O_3$—$Ga_2O_3$ (ZnS/ZnO/$In_2O_3$/$Ga_2O_3$=60/23/10/7).

The amount of the ZnS contained in the insulating layer 17 is preferably 50 mol % to 90 mol % for suitably maintaining crystallinity of the insulating layer 17.

When the amount of the ZnS is less than 50 mol %, decrease in film strength due to multi-layer formation (i.e., peeling of the film) cannot be prevented in some cases. Whereas when the amount of the ZnS is more than 90 mol %, good insulating effects cannot be obtained as a thin film in some cases.

The insulating layer 17 is preferably a porous film, in view that the electrolyte is easy to permeate the insulating layer 17. The insulating layer 17 can be formed into a porous film by forming the insulating layer 17 as a particle film. Specifically, a porous film of ZnS, etc. can be formed as the insulating layer 17 by sputtering ZnS, etc. over the particle layer which has previously been formed as an underlying layer. In this case, the fine conductive particles 122 may be used to form the particle layer. Alternatively, a porous particle film containing silica, alumina, etc. may be formed as part of the insulating layer 17. In this manner, the insulating layer 17 is formed as a porous film, which enables the electrolyte to permeate the insulating layer 17. Thus, it becomes easy for electrical charges in the form of ions of the electrolyte to move in response to oxidoreduction reaction. As a result, multi-color display excellent in response speed of color developing or erasing can be attained.

The average thickness of the insulating layer 17 is preferably 20 nm to 500 nm, more preferably 50 nm to 150 nm.

When the average thickness is smaller than 20 nm, insulation properties may be difficult to obtain. Whereas when the average thickness is greater than 500 nm, the production cost is elevated and also visibility may be decreased as a result of coloring.

<<Other Layers>>

Examples of the other layers include a white reflective layer.

—White Reflective Layer—

The white reflective layer 18 increases white reflectance. The white reflective layer 18 contains the crystalline electrolyte 131 and the white pigment particles dispersed in the crystalline electrolyte 131. The crystalline electrolyte 131 may be the same as or different from the crystalline electrolyte 131 used in the electrolyte layer 13.

In the electrochromic element 2 according to the second embodiment of the present invention, the first display electrode 11A and the second display electrode 11B are separated from each other by the insulating layer 17 and thus, the potential of the first display electrode 11A to the counter electrode 14 can be controlled independently of the potential of the second display electrode 11B to the counter electrode 14. As a result, the first electrochromic layer 12A in contact with the first display electrode 11A can be made to develop or erase color independently of the second electrochromic layer 12B in contact with the second display electrode 11B. Even when the first and second display electrodes are not completely insulated from each other, they can be controlled independently by setting the electrical resistance between the display electrodes to be larger than the electrical resistance of each display electrode. For example, in this state, the oxidation-reduction potential can be utilized between the first electrochromic layer 12A and the second electrochromic layer 12B, or a voltage for color developing or erasing can be applied to either of the display electrodes.

The first electrochromic layer 12A and the second electrochromic layer 12B are stacked at the side of the display substrate. Thus, the first electrochromic layer 12A and the second electrochromic layer 12B can be made to develop or erase color in the following three manners; i.e., only the first electrochromic layer 12A is made to develop color; only the second electrochromic layer 12B is made to develop color; and both the first electrochromic layer 12A and the second electrochromic layer 12B are made to develop color. As a result, the electrochromic display element can be changed in color at three steps, enabling multi-color display.

Also, by forming the white reflective layer 18 in the cell 16, multi-color display with excellent visibility can be attained. This is because the white reflective layer 18 has high color reflectance which compensates decrease in reflectance due to the laminated first electrochromic layer 12A and second electrochromic layer 12B.

(Production Method for Electrochromic Display Element)

Next will be described a production method for the electrochromic display element 1 of the present invention. First, the display substrate 10 is provided thereon with the display electrode 11 (or with the first display electrode 11A in the second embodiment).

Examples of the method for forming the display electrode 11 include a coating method, a gravure printing method, a screen printing method, a flexographic printing method, an offset printing method, a reverse printing method, an inkjet printing method, CVD, a plasma CVD method, a vacuum vapor deposition method, a sputtering method and an ion plating method.

After formation of the display electrode 11, the display electrode 11 is provided thereon with the electrochromic layer 12 (or with the first electrochromic layer 12A in the second embodiment). In one exemplary method for forming the electrochromic layer 12, the electrochromic compound 121 is dispersed or dissolved in a solvent to prepare a liquid coating ink, which is then applied onto the display electrode 11 by a coating method to form the electrochromic layer 12. Notably, the same method as described above can be used to form the electrochromic layer 12 in which the fine conductive particles 122 are carried on the electrochromic compounds 121.

Examples of the solvent include water, alcohols, cellosolves, halogenated hydrocarbons, ketones and ethers.

Examples of the coating method include a spin coating method, a casting method, a microgravure coating method, a gravure coating method, a bar coating method, a roller coating method, a wire bar coating method, a dip coating method, a slit coating method, a capillary coating method, a spray coating method and a nozzle coating method.

After formation of the electrochromic layer 12, the electrolyte layer 13 is formed on the electrochromic layer 12. The electrolyte layer 13 is formed by coating the electrochromic layer 12 with a solution of the crystalline electrolyte 131 and the polymerizable monomer or oligomer of an ultraviolet ray-curable resin.

Before irradiation of ultraviolet rays, the counter electrode 14 formed on the counter substrate 15 is attached onto the surface coated with the solution of the crystalline electrolyte 131 and the polymerizable monomer or oligomer of an ultraviolet ray-curable resin. After attachment of the counter electrode 14, ultraviolet rays are applied to initiate polymerization reaction. Through this polymerization reaction, the matrix resin 132 having a three-dimensionally crosslinked structure is formed while phase-separating the ultraviolet ray-curable resin from the liquid crystal compound, whereby the crystalline electrolyte 131 is dispersed as a continuous phase in the matrix resin 132. Notably, the counter electrode 14 may be formed by the same method as used for forming the display electrode 11.

The crystalline electrolyte 131 is charged in the form of monomer, and is made to permeate the entire element for curing with ultraviolet rays. The crystalline electrolyte can be in a solid state as a result of polymerization. Through this procedure, the electrolyte can be made to permeate all the layers, increasing response speed of color developing or erasing.

Examples of light sources usable for ultraviolet ray irradiation include a low-pressure mercury lamp, a high-pressure discharge lamp and a short-arc discharge lamp.

Examples of the low-pressure mercury lamp include a bactericidal lamp, a fluorescent chemical lamp and a black light.

Examples of the high-pressure discharge lamp include a high-pressure mercury lamp and a metal halide lamp.

Examples of the short-arc discharge lamp include an ultra-high-pressure mercury lamp, a xenon lamp and a mercury-xenon lamp.

In an alternative method, the electrochromic layer 12 is coated with the solution of the crystalline electrolyte 131 and the polymerizable monomer or oligomer of an ultraviolet ray-curable resin, followed by formation of the white reflective layer 18. The counter electrode 14 is attached onto the white reflective layer 18, and the resultant product is irradiated with ultraviolet rays. The white reflective layer 18 is formed as follows. Specifically, the crystalline electrolyte 131 and white pigment particles are dispersed or dissolved in a solvent to prepare a liquid coating ink, which is then applied onto the electrolyte layer 13 by a coating method to form the white reflective layer 18.

Examples of the solvent include water, alcohols, cellosolves, halogenated hydrocarbons, ketones and ethers.

Examples of the coating method include a spin coating method, a casting method, a microgravure coating method, a gravure coating method, a bar coating method, a roller coating method, a wire bar coating method, a dip coating method, a slit coating method, a capillary coating method, a spray coating method and a nozzle coating method.

In the electrochromic display element according to the second embodiment, the insulating layer 17 is optionally formed after formation of the first display electrode 11A and the first electrochromic layer 12A. Examples of methods for forming the insulating layer 17 include CVD, a plasma CVD method, a vacuum vapor deposition method, a sputtering method and an ion plating method.

After formation of the insulating layer, the second display electrode 11B is formed in the same manner as employed for forming the first display electrode 11A. After formation of the second display electrode 11B, the second electrochromic layer 12B is formed in the same manner as employed for forming the first electrochromic layer 12A.

EXAMPLES

The present invention will next be described by way of Examples, which should not be construed as limiting the present invention thereto.

Synthesis Example 1

Preparation of Electrolyte Layer Precursor Material

A propylene carbonate solution of hyperchloric acid tetrabutylammonium salt (serving as an electrolyte) (concentration: 2 mol/L), was mixed with PNM-170 (product of DIC Corporation) containing a liquid crystal compound for PNLC, a polymerizable monomer and a polymerization initiator.

The concentration of the propylene carbonate solution of hyperchloric acid tetrabutylammonium salt was adjusted to be about 0.04 mol/L. Also, 0.2% by mass of spherical resin beads (weight average particle diameter: 10 μm) was dispersed in the resultant mixture for controlling the average thickness of the formed electrolyte layer, to thereby prepare an electrolyte layer precursor material.

Synthesis Example 2

Preparation of Electrolyte Layer Precursor Material

Ionic liquid 1-ethyl-3-methylimidazolium bis(trifluoromethanesulfonyl)imide (EMI-TFSI), serving as an electrolyte, was mixed with PNM-170 (product of DIC Corporation) containing a liquid crystal compound for PNLC, a polymerizable monomer and a polymerization initiator.

The concentration of the EMI-TFSI was adjusted to be about 0.1 mol/L. Also, 0.2% by mass of spherical resin beads (weight average particle diameter: 10 μm) was dispersed in the resultant mixture for controlling the average thickness of the formed electrolyte layer, to thereby prepare an electrolyte layer precursor material.

Example 1

Production of Electrochromic Display Element

—Formation of Display Electrode—
Through sputtering, an ITO film having an average thickness of 100 nm was formed entirely on a 40 mm×40 mm glass substrate (display substrate) to form a display electrode. The resistance between the ends of the electrode was found to be about 200Ω.

—Formation of Electrochromic Layer—
The display electrode was coated through spin coating with a titanium oxide nanoparticle dispersion liquid (SP210, product of Showa Titanium Co.), followed by annealing at 120° C. for 15 min, to thereby form a titanium oxide particle film on the display electrode. The titanium oxide particle film was coated through spin coating with a 5% by mass 2,2,3,3-tetrafluoropropanol solution of viologen compound (A) having the following Structural Formula, followed by annealing at 120° C. for 10 min, to thereby form an electrochromic layer containing the titanium oxide nanoparticles and the electrochromic compound.

Viologen compound (A)

—Formation of Counter Electrode—
Through sputtering, an ITO film having an average thickness of 100 nm was formed on a 10 mm×30 mm region of the top surface of a 40 mm×40 mm glass substrate (counter substrate) to form a counter electrode. The resistance between the ends of the electrode was found to be about 200Ω.

—Formation of Electrolyte Layer—
The electrochromic layer was coated with the electrolyte layer precursor material prepared in Synthesis Example 1. After coating, the counter electrode was laid thereon, and then irradiated with ultraviolet rays having a peak wavelength of 365 nm (irradiation light intensity: 50 mW/cm$^2$) from the counter electrode side for 2 min using a high-pressure mercury lamp to cause photopolymerization phase separation, to thereby produce an electrochromic display element containing an electrolyte layer. The electrolyte layer was in white as a result of light scattering, indicating that it had a desired structure.

Example 2

Production of Electrochromic Display Element

The procedure of Example 1 was repeated, except that the electrolyte layer precursor material prepared in Synthesis Example 1 was changed to the electrolyte layer precursor material prepared in Synthesis Example 2, to thereby produce an electrochromic display element.

Example 3

Production of Electrochromic Display Element

The procedure of Example 1 was repeated, except that an electrochromic display element was produced as follows, to thereby produce an electrochromic display element.

—Formation of First Display Electrode—
Through sputtering, an ITO film having an average thickness of 100 nm was formed on a 30 mm×25 mm region of the top surface of a 40 mm×40 mm glass substrate (display substrate) to form a first display electrode. The resistance between the ends of the electrode was found to be about 200Ω.

—Formation of First Electrochromic Layer—
The first display electrode was coated through spin coating with a titanium oxide nanoparticle dispersion liquid (SP210, product of Showa Titanium Co.), followed by annealing at 120° C. for 15 min, to thereby form a titanium oxide particle film on the first display electrode. The titanium oxide particle film was coated through spin coating with a 1% by mass 2,2,3,3-tetrafluoropropanol solution of viologen compound (A) having the above Structural Formula, followed by annealing at 120° C. for 10 min, to thereby form a first electrochromic layer containing the titanium oxide nanoparticles and the electrochromic compound.

—Formation of Protective Layer—
The first electrochromic layer was coated through spin coating with a 0.1% by mass ethanol solution of poly(N-vinylamine) and a 0.5% by mass aqueous solution of polyvinyl alcohol, to thereby form a protective layer.

—Formation of Insulating Layer—
ZnS—SiO$_2$ (ZnS/SiO$_2$=8/2) was applied through sputtering onto the protective layer to form an insulating layer having a thickness of 25 nm to 150 nm.

—Formation of Second Display Electrode—
Through sputtering, an ITO film having an average thickness of 100 nm was formed in a 25 mm×25 mm region of the insulating layer so that the ITO film was not overlapped with the previously formed ITO film (the first display electrode), to thereby form a second display electrode. The resistance between the ends of the electrode was found to be about 200Ω.

—Formation of Second Electrochromic Layer—
The second display electrode was coated through spin coating with a titanium oxide nanoparticle dispersion liquid (SP210, product of Showa Titanium Co.), followed by annealing at 120° C. for 15 min, to thereby form a titanium oxide particle film on the second display electrode. The titanium oxide particle film was coated through spin coating with a 1% by mass 2,2,3,3-tetrafluoropropanol solution of viologen compound (A) having the above Structural Formula, followed by annealing at 120° C. for 10 min, to thereby form a second electrochromic layer containing the titanium oxide particles and the electrochromic compound.

(Evaluation)

Each of the above-produced electrochromic display elements was evaluated for high-speed response of color developing or erasing, image blur, white reflectance and multicolor display. The results are shown in Table 1.

<High-Speed Response>

A negative electrode was connected to the display electrode and a positive electrode was connected to the counter electrode of each electrochromic display element. Then, a voltage of 6 V was applied to measure the time required that the electrochromic display element developed color from the application of voltage. Here, the color developing was visually confirmed. Similarly, a voltage of −6 V was applied to measure the time required for color developing from the application of voltage.

<Observation of Image Blur>

A negative electrode was connected to the display electrode and a positive electrode was connected to the counter electrode of each electrochromic display element, and then a voltage of 6 V was applied thereto. The electrochromic display element was left to stand for 30 min, and was visually observed for the boundaries between portions where color was developed and portions where no color was developed (i.e., portions where no ITO film (counter electrode) had been formed) and evaluated according to the following evaluation criteria.

[Evaluation Criteria]

A: No change from the state immediately after color developing was observed and no image blur over time was observed.
B: Slight change from the state immediately after color developing was observed but no image blur over time was observed
C: No change from the state immediately after color developing was observed but image blur over time was observed.
D: Change from the state immediately after color developing was observed and image blur over time was observed.

TABLE 1

|  | Evaluation | |
| --- | --- | --- |
|  | Response | Image blur |
| Example 1 | 500 ms | A |
| Example 2 | 500 ms | A |
| Example 3 | 500 ms | A |

As is clear from Table 1, no image blur was observed in Examples 1 to 3. This is likely because formation of the three-dimensionally crosslinked structure increased the viscosity of the electrolyte to suppress diffusion of charges to the electrolyte layer.

The electrochromic display elements of Examples 1 to 3 were found to exhibit good high-speed response. When an electrical field is applied to the element for attaining high-speed response, the crystalline electrolyte is anisotropically oriented along the direction of the electrical field. One possible reason why good high-speed response was obtained lies in that charges tended to flow in the direction of the electrical field; i.e., between the display electrode and the counter electrode. Also, one possible reason why no image blur was observed lies in that, after termination of the color-developing reaction, the crystalline electrolyte was randomly re-dispersed under no electrical field, and then diffusion of charges was suppressed as described above to avoid spread of color-developing portions.

INDUSTRIAL APPLICABILITY

The electrochromic display element of the present invention is useful for an electronic paper, an electrochromic mirror, etc.

What is claimed is:

1. An electrochromic display element comprising:
a display substrate,
at least one display electrode,
a counter electrode,
a counter substrate,
at least one electrochromic layer in contact with the display electrode, and
an electrolyte layer between the electrochromic layer and the counter electrode,
wherein the electrolyte layer contains a matrix resin having a three-dimensionally crosslinked structure and a mixture of a liquid crystal compound and an electrolyte,
wherein a crystalline electrolyte including the mixture of the liquid crystal compound and the electrolyte is dispersed as a continuous phase in the matrix resin, and the electrolyte layer has a polymer network liquid crystal structure formed from the crystalline electrolyte dispersed as the continuous phase in the matrix resin, and
wherein the electrolyte layer is formed by forming the matrix resin through the polymerization reaction of the mixture of polymerizable monomer or oligomer of the matrix resin and the liquid crystal electrolyte while phase-separating the matrix resin from the liquid crystal compound.

2. The electrochromic display element according to claim 1, wherein the matrix resin is formed of an ultraviolet ray-curable resin material.

3. The electrochromic display element according to claim 2, wherein the electrolyte layer is formed by applying ultraviolet rays through the counter substrate or the display substrate to the mixture of the liquid crystal compound and the electrolyte as well as a polymerizable monomer or oligomer of the matrix resin, to polymerize the polymerizable monomer or oligomer.

4. The electrochromic display element according to claim 1, wherein the electrochromic layer contains fine conductive particles or fine semiconductor particles carrying an electrochromic compound on surfaces thereof.

5. An electrochromic display element comprising:
a display substrate,
a plurality of display electrodes spaced from each other,
a plurality of electrochromic layers which are respectively in contact with the plurality of the display electrodes,
a counter substrate,
a counter electrode, and
an electrolyte layer between the counter electrode and the display electrode that is located nearest to the counter electrode,
wherein the electrolyte layer contains a matrix resin having a three-dimensionally crosslinked structure and a mixture of a liquid crystal compound and an electrolyte,
wherein a crystalline electrolyte including the mixture of the liquid crystal compound and the electrolyte is dispersed as a continuous phase in the matrix resin, and the electrolyte layer has a polymer network liquid crystal structure formed from the crystalline electrolyte dispersed as the continuous phase in the matrix resin,
wherein the electrolyte layer is formed by forming the matrix resin through the polymerization reaction of the mixture of polymerizable monomer or oligomer of the matrix resin and the liquid crystal electrolyte while phase-separating the matrix resin from the liquid crystal compound, and wherein an electrical resistance between one of the display electrodes and the other display electrode or any of the other display electrodes is greater than an electrical resistance of the one of the display electrodes.

6. The electrochromic display element according to claim 5, wherein the matrix resin is formed of an ultraviolet ray-curable resin material.

7. The electrochromic display element according to claim 6, wherein the electrolyte layer is formed by applying ultraviolet rays through the counter substrate or the display substrate to the mixture of the liquid crystal compound and the electrolyte as well as a polymerizable monomer or oligomer of the matrix resin, to polymerize the polymerizable monomer or oligomer.

8. The electrochromic display element according to claim 5, wherein each of the electrochromic layers contains fine conductive particles or fine semiconductor particles carrying an electrochromic compound on surfaces thereof.

* * * * *